(12) United States Patent
Shirakawa

(10) Patent No.: US 12,099,183 B2
(45) Date of Patent: Sep. 24, 2024

(54) OPTICAL SCANNING APPARATUS

(71) Applicant: CANON KABUSHIKI KAISHA, Tokyo (JP)

(72) Inventor: Chihiro Shirakawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 17/548,308

(22) Filed: Dec. 10, 2021

(65) Prior Publication Data

US 2022/0197019 A1    Jun. 23, 2022

(30) Foreign Application Priority Data

Dec. 17, 2020    (JP) ................. 2020-209701

(51) Int. Cl.
| G02B 26/12 | (2006.01) |
| G02B 7/02 | (2021.01) |
| G02B 26/08 | (2006.01) |
| G02B 27/30 | (2006.01) |

(52) U.S. Cl.
CPC ............. *G02B 26/12* (2013.01); *G02B 7/02* (2013.01); *G02B 26/0816* (2013.01); *G02B 27/30* (2013.01)

(58) Field of Classification Search
CPC ...... G02B 26/12; G02B 7/02; G02B 26/0816; G02B 27/30; G02B 27/09; G02B 5/09; G02B 26/123; G03G 15/04036
See application file for complete search history.

(56) References Cited

U.S. PATENT DOCUMENTS

| 9,664,901 B2 * | 5/2017 | Chen .................... G02B 26/123 |
| 2011/0116835 A1 | 5/2011 | Naito |
| 2012/0154883 A1 | 6/2012 | Cho |
| 2017/0090188 A1 | 3/2017 | Chen |

FOREIGN PATENT DOCUMENTS

| CN | 102053364 A | 5/2011 |
| JP | H06347713 A | 12/1994 |
| JP | 2004253080 A | 9/2004 |
| JP | 2004317724 A | 11/2004 |
| JP | 2004334174 A | 11/2004 |
| JP | 2005321475 A | 11/2005 |
| JP | 2007003594 A | 1/2007 |
| JP | 2008064802 A | 3/2008 |
| JP | 2008268239 A | 11/2008 |
| JP | 5031485 B2 | 9/2012 |

(Continued)

OTHER PUBLICATIONS

A novel laser beam scanner; China Academic Journal Electronic Publishing House; http://www.cnki.net, 1991.

(Continued)

*Primary Examiner* — James C. Jones
(74) *Attorney, Agent, or Firm* — Canon U.S.A., Inc. IP Division

(57) ABSTRACT

A collimator lens is held by a holder so that, while viewing the collimator lens in an axial direction of a plurality of beams passing through the collimator lens, a straight line connecting between a center of the collimator lens and a gate portion is substantially parallel or substantially orthogonal to a straight line connecting between centers of the plurality of beams transmitting through the collimator lens.

10 Claims, 12 Drawing Sheets

(56) References Cited

FOREIGN PATENT DOCUMENTS

| JP | 2013080023 A | 5/2013 |
| JP | 2014048563 A | 3/2014 |
| JP | 2014063028 A | 4/2014 |
| JP | 2017159538 A | 9/2017 |
| JP | 2017207539 A | 11/2017 |
| WO | 2017208704 A1 | 12/2017 |

OTHER PUBLICATIONS

Study on Birefringence of Plastic Optical Components Based on CAE Technology; China Academic Journal Electronic Publishing House; http://www.cnki.net.; vol. 42, No. 1 (Sum. 261), Jan. 2014; 1005-3360 (2014) 01-0098-03; pp. 98-100.

\* cited by examiner

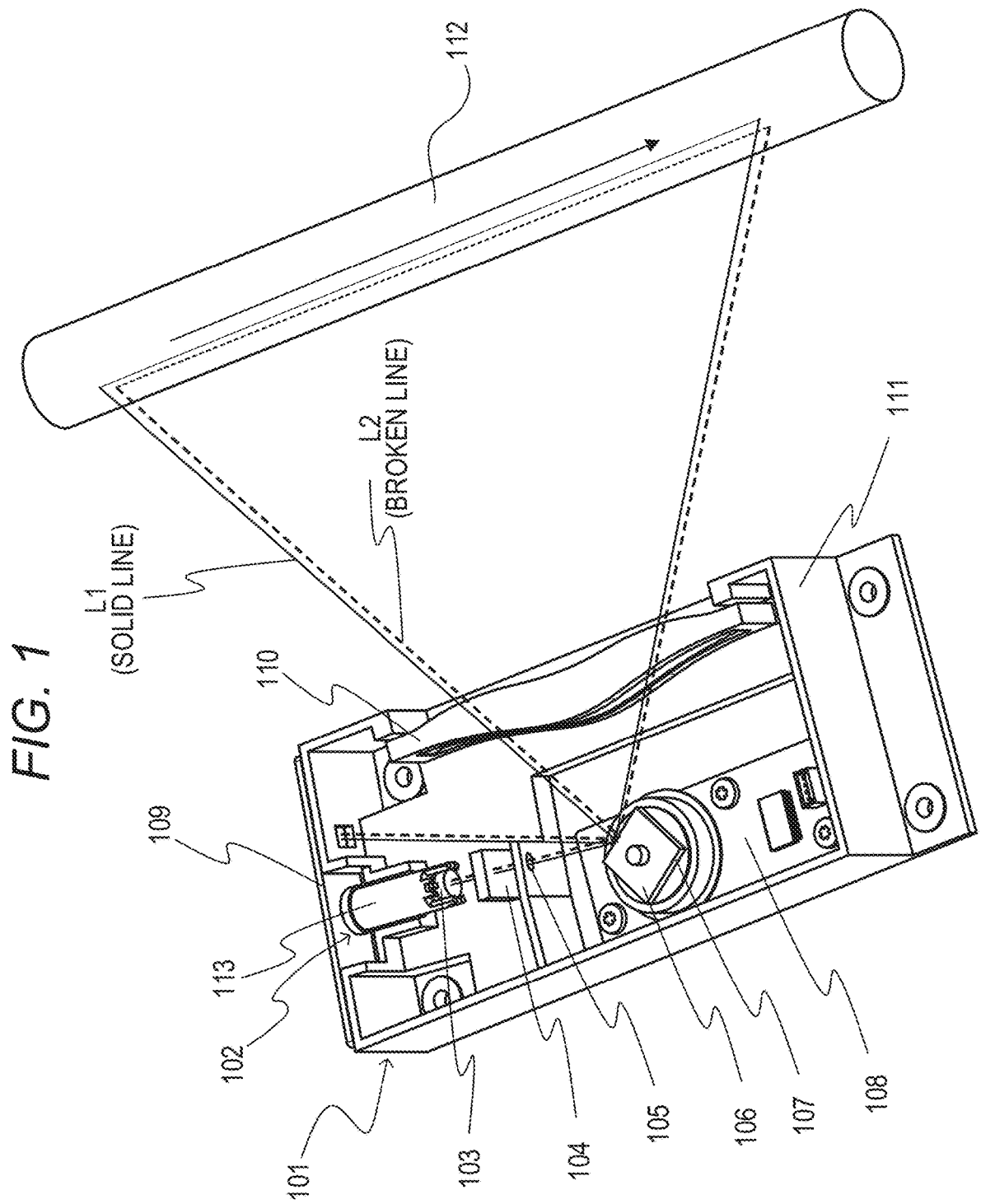

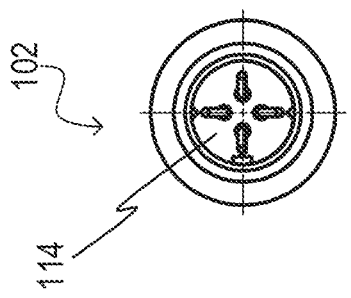
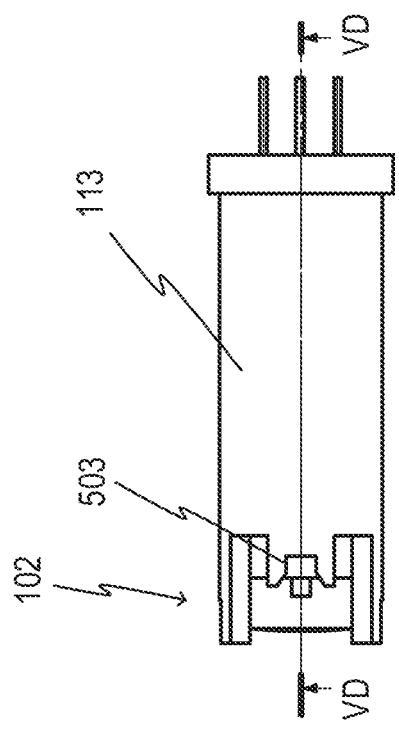
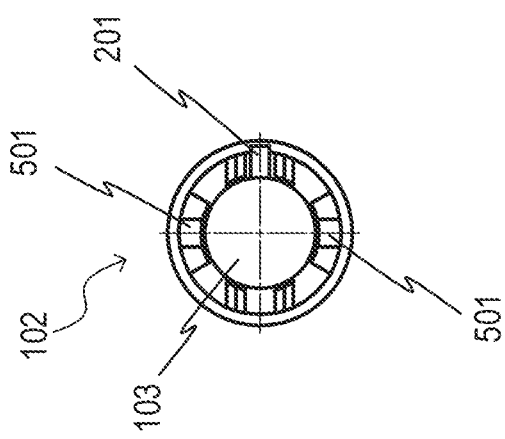
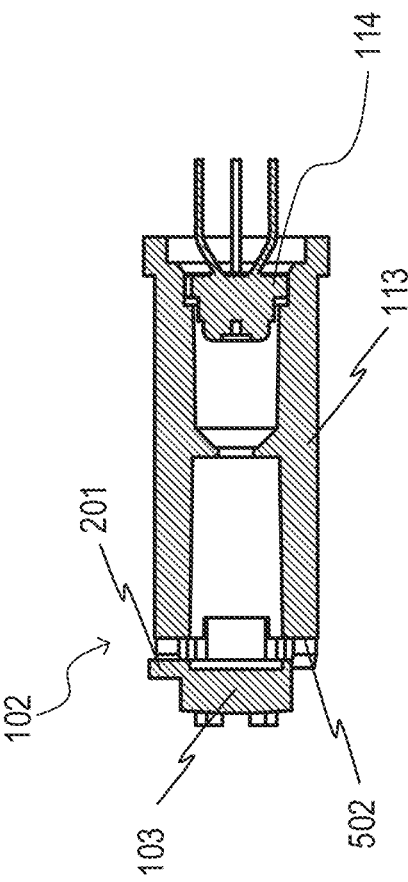

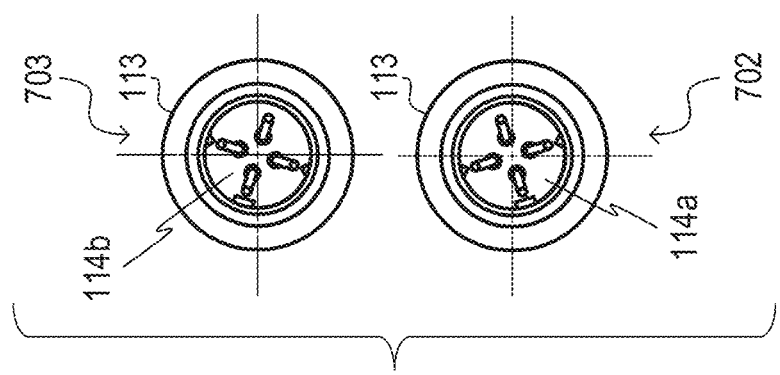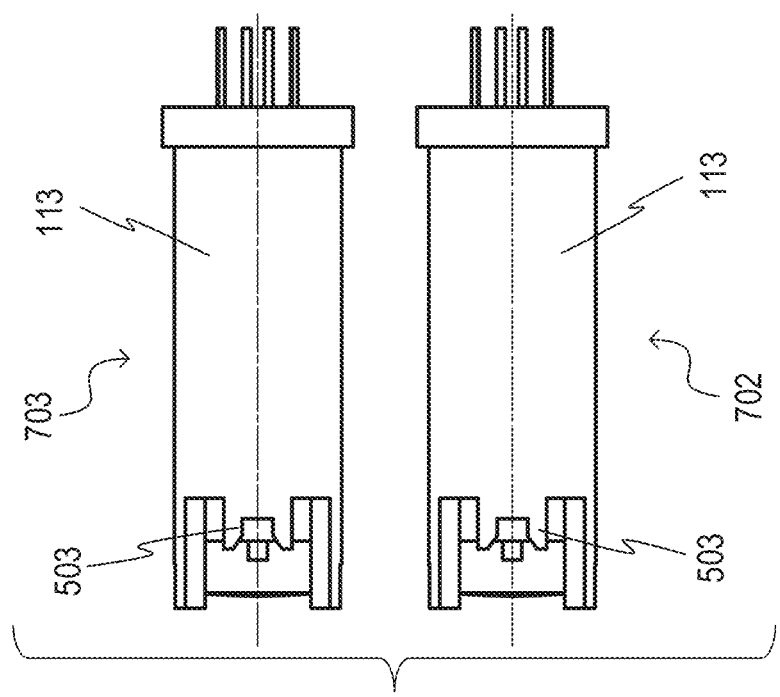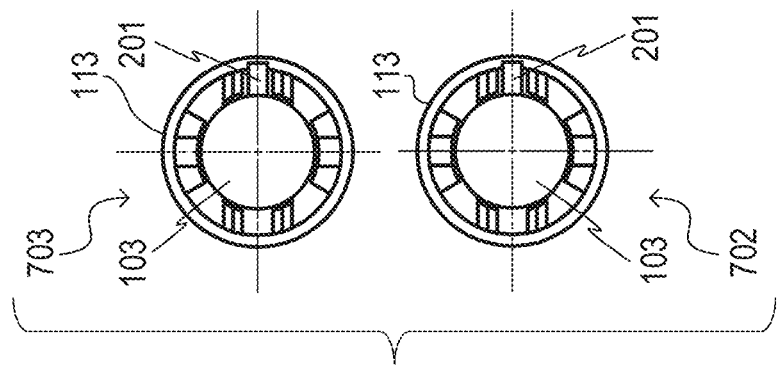

OPTICAL SCANNING APPARATUS

BACKGROUND OF THE DISCLOSURE

Field of the Disclosure

The present disclosure relates to an optical scanning apparatus to be included in an image forming apparatus such as a laser beam printer or a digital copying machine.

Description of the Related Art

An optical scanning apparatus to be used in an image forming apparatus such as a laser beam printer or a copying machine includes, for example, a light source unit configured to emit laser light or the like, and lenses such as a collimator lens and a scanning lens. The collimator lens converts laser light emitted from the light source unit into parallel beams. The scanning lens has an fθ characteristic. In recent years, in the optical scanning apparatus, in order to meet demands for higher speed and higher image quality, multi-beaming of providing a plurality of light emitting points in the light source unit to emit a plurality of light beams has been promoted. Further, reduction in cost of the optical scanning apparatus has also been demanded, and thus use of a resin as a material for the collimator lens has been promoted for the purpose of reducing cost of a lens material.

For example, in Japanese Patent Application Laid-Open No. 2008-64802, an outer shape of a collimator lens, which is a rotationally symmetric lens having a lens surface shape rotationally symmetric to an optical axis, is formed into a substantially cylindrical shape. In this manner, while a required effective diameter is ensured, the volume of the lens is reduced as much as possible to reduce the cost of the lens material. However, the collimator lens of Japanese Patent Application Laid-Open No. 2008-64802 has the following problem. That is, a collimator lens made of a resin is generally manufactured by molding, which allows a low product unit price and is suitable for mass production. The collimator lens is obtained through injection molding by pouring a resin through a gate of a mold for lens molding. At this time, birefringence distributed depending on a direction in which the resin is poured into the mold, that is, a direction of a gate portion extending from a lens outer circumferential portion is caused in the collimator lens made of a resin. The birefringence causes reduction in optical characteristic of a beam transmitted through the lens. Thus, when the collimator lens made of a resin is used in the optical scanning apparatus, even in the case of the rotationally symmetric lens, it is required to consider the direction of the gate portion. In particular, when the light source unit of the optical scanning apparatus includes a plurality of light emitting points as in a multi-beam laser semiconductor, each of the laser beams emitted from the plurality of light emitting points is affected by the birefringence. Accordingly, a difference may be caused in a degree of influence on the optical characteristic exerted on each laser beam, depending on a difference in position of the birefringence distribution through which each laser beam is transmitted. As a result, a relative difference in spot diameter, laser light amount, or the like is caused between the plurality of laser beams. Thus, desired imaging performance cannot be obtained, and image deterioration is caused.

In view of the above, in order to solve the above-mentioned problem, for example, in Japanese Patent No. 5031485, there is disclosed an optical scanning apparatus in which a gate portion is formed at an edge portion extending from a side surface of the collimator lens so that the birefringence caused at the time of lens molding does not affect a beam transmitting region on the lens. As a result of forming the gate portion at the edge portion, an increase in spot diameter of the laser beam is reduced, and a higher image quality is achieved.

However, the above-mentioned optical scanning apparatus of Japanese Patent No. 5031485 has the following problem. That is, when the edge portion is formed at the side surface of the collimator lens in order to prevent the influence of the birefringence caused at the time of lens molding from reaching the beam transmitting region on the lens, the collimator lens is increased in diameter by an amount of the edge portion with respect to the required lens outer shape. Accordingly, there arises a problem in that, as compared to the substantially cylindrical lens in which the volume of the lens is reduced as much as possible while the required effective diameter is ensured as the collimator lens of the optical scanning apparatus of Japanese Patent Application Laid-Open No. 2008-64802, the material cost and the molding cost of the lens are increased.

SUMMARY OF THE DISCLOSURE

The present disclosure has been made in view of the above-mentioned circumstances, and has an object to reduce an increase in spot diameter of a laser beam at low cost through use of a collimator lens made of a resin.

According to one embodiment, there is provided an optical scanning apparatus, comprising: a laser unit including: a light source including a plurality of light emitting points configured to emit a plurality of beams; a collimator lens made of a resin, the collimator lens including a lens surface through which the plurality of beams emitted from the light source are transmitted and a gate portion provided at an outer circumferential portion of the lens surface; and a holder having a cylindrical shape and configured to hold the light source and the collimator lens; and a rotary polygon mirror configured to deflect the plurality of beams emitted from the laser unit, wherein the collimator lens is held by the holder so that, while viewing the collimator lens in an axial direction of the plurality of beams passing through the collimator lens, a straight line connecting between the gate portion and a center of the collimator lens is substantially parallel or substantially orthogonal to a straight line connecting between centers of the plurality of beams transmitting through the collimator lens.

Further features of the present disclosure will become apparent from the following description of exemplary embodiments with reference to the attached drawings.

BRIEF DESCRIPTION OF THE DRAWINGS

FIG. 1 is a schematic view for illustrating a configuration of an optical scanning apparatus of a first embodiment.

FIG. 5A, FIG. 5B, FIG. 5C, and FIG. 5D are views for illustrating a configuration of a laser unit in the first embodiment.

FIG. 8A, FIG. 8B, and FIG. 8C are views for illustrating configurations of laser units in the second embodiment.

DESCRIPTION OF THE EMBODIMENTS

Figure 2C:
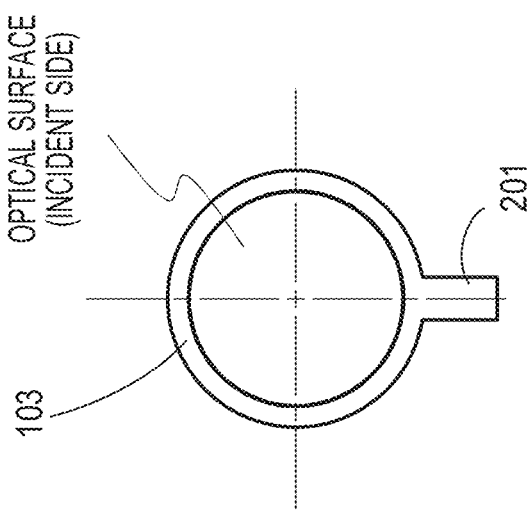
FIG. 2A, FIG. 2B, and FIG. 2C are views for illustrating an outer shape of a collimator lens in the first embodiment.

Now, embodiments of the present disclosure are described in detail with reference to the drawings.

First Embodiment

[Configuration of Optical Scanning Apparatus]

FIG. 1 is a schematic view for illustrating a configuration of an optical scanning apparatus 101 of a first embodiment. Further, in FIG. 1, in order to describe a correspondence between an image forming apparatus and the optical scanning apparatus 101 to be mounted to the image forming apparatus, there is illustrated a photosensitive drum 112 to be irradiated with laser light emitted from the optical scanning apparatus 101. The image forming apparatus includes an image forming portion including the photosensitive drum 112. The image forming portion forms a toner image by causing toner to adhere to an electrostatic latent image formed on the photosensitive drum 112 through irradiation with the laser beam emitted from the optical scanning apparatus 101. Further, the image forming apparatus performs image formation by transferring the toner image formed on the photosensitive drum 112 of the image forming portion onto a recording material serving as a recording medium.

In FIG. 1, a laser unit 102 includes a light source unit 114 (not shown in FIG. 1, see FIG. 5C), a collimator lens 103 made of a resin, and a holder 113 having a cylindrical shape and configured to hold the light source unit 114 and the collimator lens 103. The optical scanning apparatus 101 includes a cylindrical lens 104, an aperture diaphragm 105, and a rotary polygon mirror 106. The aperture diaphragm 105 regulates a light beam emitted from the light source unit 114 and transmitted through the cylindrical lens 104. The rotary polygon mirror 106 has a reflection surface 107. The light beam passing through the aperture diaphragm 105 enters the reflection surface 107. Further, the optical scanning apparatus 101 includes a scanner motor 108, a circuit board 109, and a scanning lens 110. The scanner motor 108 drives the rotary polygon mirror 106 to rotate. The circuit board 109 performs light emission control of the light source unit 114 held by the laser unit 102. In an optical box 111 serving as a casing of the optical scanning apparatus 101, the above-mentioned optical members are accommodated. Further, the cylindrical lens 104 is fixed to the optical box 111, and the scanner motor 108 is fixed to the optical box 111 by screw fastening. The scanning lens 110 serving as an imaging unit is fixed with an adhesive to the optical box 111.

The laser unit 102 includes, as the light source unit 114, a multi-beam laser semiconductor including two light emitting points. The multi-beam laser semiconductor emits two laser beams L1 and L2. A light path of the laser beam L1 is indicated by the solid line in FIG. 1, and a light path of the laser beam L2 is indicated by the broken line in FIG. 1. The laser beams L1 and L2 emitted from the light source unit 114 are transmitted through the collimator lens 103 and the cylindrical lens 104 so as to enter the reflection surface 107 of the rotary polygon mirror 106. The rotary polygon mirror 106 is driven to rotate by the scanner motor 108 so as to deflect the laser beams L1 and L2 entering the reflection surface 107 of the rotary polygon mirror 106. After that, the laser beams L1 and L2 deflected by the rotary polygon mirror 106 are transmitted through the scanning lens 110 so as to be radiated onto the surface of the photosensitive drum 112. Thus, an electrostatic latent image is formed on the photosensitive drum 112.

As described above, the multi-beam laser semiconductor is mounted as the light source unit 114 of the laser unit 102 in the first embodiment. Thus, as compared to a single-beam laser semiconductor including only one light emitting point, the surface of the photosensitive drum 112 can be scanned for a plurality of rows at a time. Accordingly, the multi-beam laser semiconductor can scan the surface of the photosensitive drum 112 in a time shorter than that in the case of the single-beam laser semiconductor. A direction in which the laser beams L1 and L2 deflected by the rotary polygon mirror 106 scan the surface of the photosensitive drum 112 (in the direction indicated by the arrow in FIG. 1) is referred to as "main scanning direction," and a rotation direction of the photosensitive drum 112, which is orthogonal to the main scanning direction, is referred to as "sub-scanning direction."

Now, a method of adjusting assembly of the laser unit 102 to the optical box 111 is described. The multi-beam laser semiconductor serving as the light source unit 114 is press-fitted and fixed to one end of the holder 113 of the laser unit 102. Further, the collimator lens 103 is fixed to another end of the holder 113 of the laser unit 102 as described later. Then, in order to ensure a positional accuracy of a scanning line interval (interval in the sub-scanning direction on the photosensitive drum 112) between the laser beams L1 and L2, the laser unit 102 to which the light source unit 114 and the collimator lens 103 are fixed is subjected to adjustment of the scanning line interval (printing interval) of the laser beams L1 and L2. The adjustment of the scanning line interval is performed by rotating the laser unit 102 about a cylinder axis of the holder 113. After the adjustment of the scanning line interval is ended, the laser unit 102 is assembled to the optical box 111, and is fixed with an adhesive or the like.

[Collimator Lens]

Figure 2B:
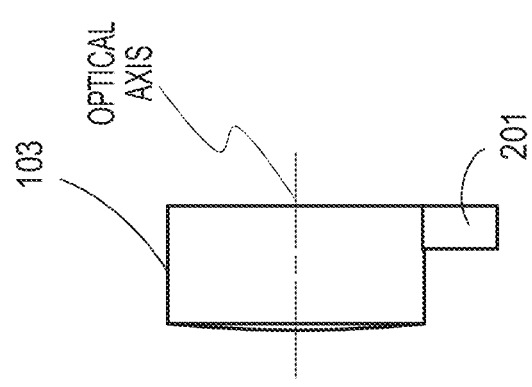
Figure 2A:
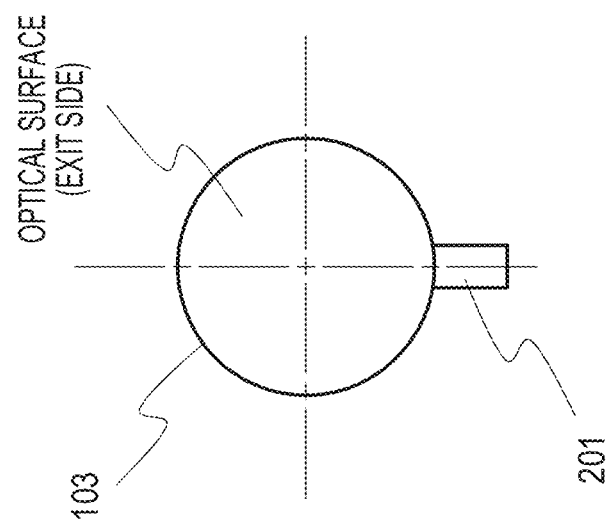

Next, the collimator lens 103 made of a resin in the first embodiment is described. FIG. 2A, FIG. 2B, and FIG. 2C are views for illustrating an outer shape of the collimator lens 103 made of a resin in the first embodiment. FIG. 2A is a front view for illustrating the outer shape when the collimator lens 103 is viewed from a direction in which the laser beams L1 and L2 exit from the collimator lens 103 (exit side), and FIG. 2B is a side view for illustrating the outer shape when the collimator lens 103 illustrated in FIG. 2A is viewed from the right side of FIG. 2A. Further, FIG. 2C is a rear view for illustrating the outer shape when the collimator lens 103 illustrated in FIG. 2A is viewed from a direction in which the laser beams L1 and L2 enter the collimator lens 103 (incident side).

As illustrated in FIG. 2A and FIG. 2C, the collimator lens 103 has an optical surface formed into a shape rotationally symmetric with respect to an optical axis (indicated by the long dashed short dashed line of FIG. 2B). Accordingly, as compared to a glass lens formed by polishing glass, the material cost and the molding cost are lower because the collimator lens 103 is molded with resin. Further, the outer shape of the collimator lens 103 is formed into a cylindrical shape so that the volume is reduced as much as possible while a required effective diameter is ensured, thereby being capable of reducing the cost of the lens material.

The collimator lens 103 made of a resin is manufactured through injection molding by pouring a resin through a gate of a mold for lens molding (not shown). Accordingly, in the molded collimator lens 103, a gate portion 201 (FIG. 2A, FIG. 2B, and FIG. 2C) being a protruding portion solidified in the gate considerably remains in a part directly connected to the gate of the mold into which the resin is poured. Then, the thus-manufactured collimator lens 103 made of a resin has an area in which birefringence is caused. The birefringence is distributed depending on a direction in which the resin is poured into the mold at the time of molding, that is, a direction or a position of the gate portion 201. The birefringence causes reduction in optical characteristic of the laser beams L1 and L2 transmitted through the collimator lens 103. Thus, when the collimator lens 103 made of a resin is used in the optical scanning apparatus 101, even in the case of the rotationally symmetric lens, it is required to consider the direction of the gate portion 201. In particular, when the light source unit 114 of the optical scanning apparatus 101 is an element including a plurality of light emitting points as in the multi-beam laser semiconductor in the first embodiment, there is a concern that each of the laser beams L1 and L2 emitted from the plurality of light emitting points may be affected by the birefringence. Accordingly, a phase difference may be caused in a polarized light component of the laser beam depending on a difference in position of the birefringence distribution through which each laser beam is transmitted, which may result in causing a difference in degree of influence on the optical characteristic (for example, spot diameter or laser light amount) exerted on each laser beam. As a result, desired imaging performance may not be obtained, and an image quality may be reduced.

[Birefringence Distribution and Influence on Laser Beam]

Figure 3A:
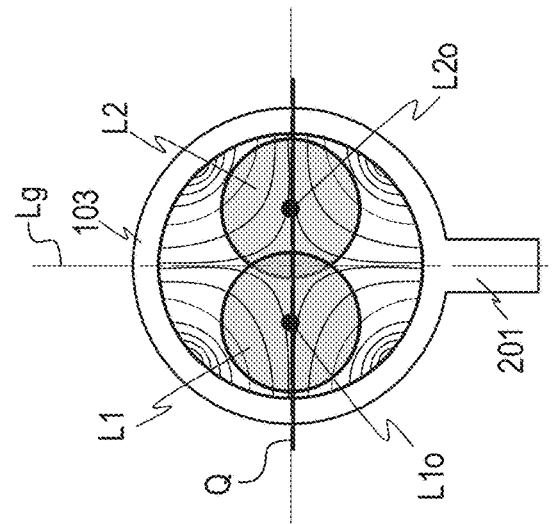
FIG. 3A, FIG. 3B, and FIG. 3C are views for illustrating a birefringence distribution on the collimator lens in the first embodiment.

Next, a birefringence distribution to be caused in the resin collimator lens in the first embodiment and the influence caused by the birefringence distribution on the laser beam are described with reference to FIG. 3A, FIG. 3B, FIG. 3C, and FIG. 4. FIG. 3A is a view for illustrating the birefringence distribution caused on the collimator lens 103 made of a resin illustrated in FIG. 2C. As illustrated in FIG. 3A, the birefringence distribution is caused depending on the direction of the gate portion 201, that is, the direction from the gate portion 201 toward a center of the collimator lens 103 (hereinafter referred to as "direction of gate portion 201"). The birefringence is caused due to an internal stress generated at the time of lens molding or during a lens cooling process. In the collimator lens 103 made of a resin in the first embodiment, the birefringence has the following tendency as illustrated in FIG. 3A. That is, the birefringence tends to have a stronger influence at phases of 45° with respect to a straight line passing through the center of the collimator lens 103 and being orthogonal to the direction of the gate portion 201, and as coming closer to the outer circumferential side of the collimator lens 103. In the birefringence distribution illustrated in FIG. 3A, the magnitude of the birefringence is represented by how wide or narrow the intervals of lines are. It is represented that a change ratio of the magnitude of the birefringence is larger as the intervals of the lines are narrower.

Figure 3B:
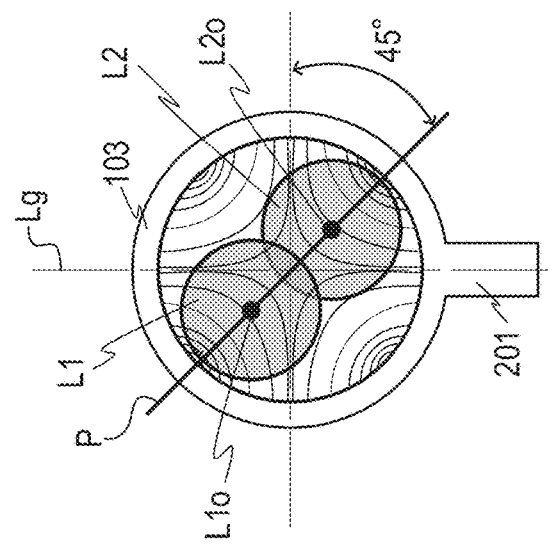
Figure 3C:
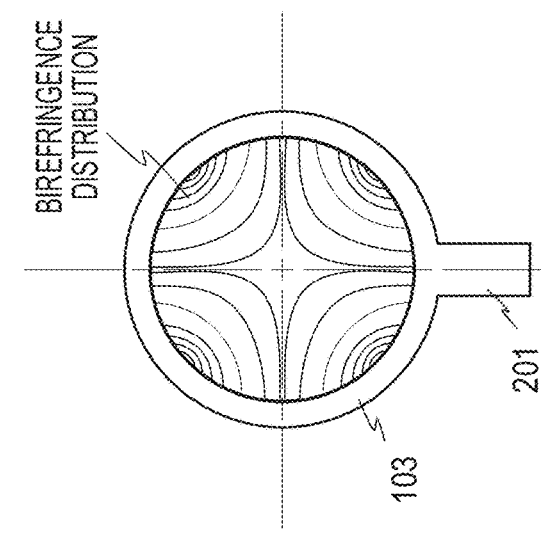

FIG. 3B is a view for illustrating ranges of the laser beams L1 and L2 in a case in which a straight line P connecting between light emitting points L1o and L2o of the laser beams L1 and L2 emitted from the light source unit 114 to be transmitted through the collimator lens 103 is tilted by 45° with respect to the gate portion 201. Further, FIG. 3C is a view for illustrating ranges of the laser beams L1 and L2 in a case in which a straight line Q connecting between the light emitting points L1 o and L2o of the laser beams L1 and L2 emitted from the light source unit 114 to be transmitted through the collimator lens 103 is orthogonal to the gate portion 201. A straight line Lg is a straight line connecting between the center of the collimator lens 103 and the gate portion 201. As illustrated in FIG. 3A, the birefringence distribution tends to have a stronger influence at phases of 45° with respect to the straight line orthogonal to the direction of the gate portion 201, and as coming closer to the outer circumferential side of the collimator lens 103. Accordingly, when the straight line P connecting between the light emitting points L1o and L2o is tilted by 45° with respect to the gate portion 201 as illustrated in FIG. 3B, parts of the laser beams L1 and L2 are transmitted through regions of the collimator lens 103 having a large influence of the birefringence. Meanwhile, as illustrated in FIG. 3C, the straight line Q connecting between the light emitting points L1o and L2o is orthogonal to the direction of the gate portion 201, and hence the laser beams L1 and L2 are transmitted through regions of the collimator lens 103 deviated from the regions having the large influence of the birefringence.

Figure 4:
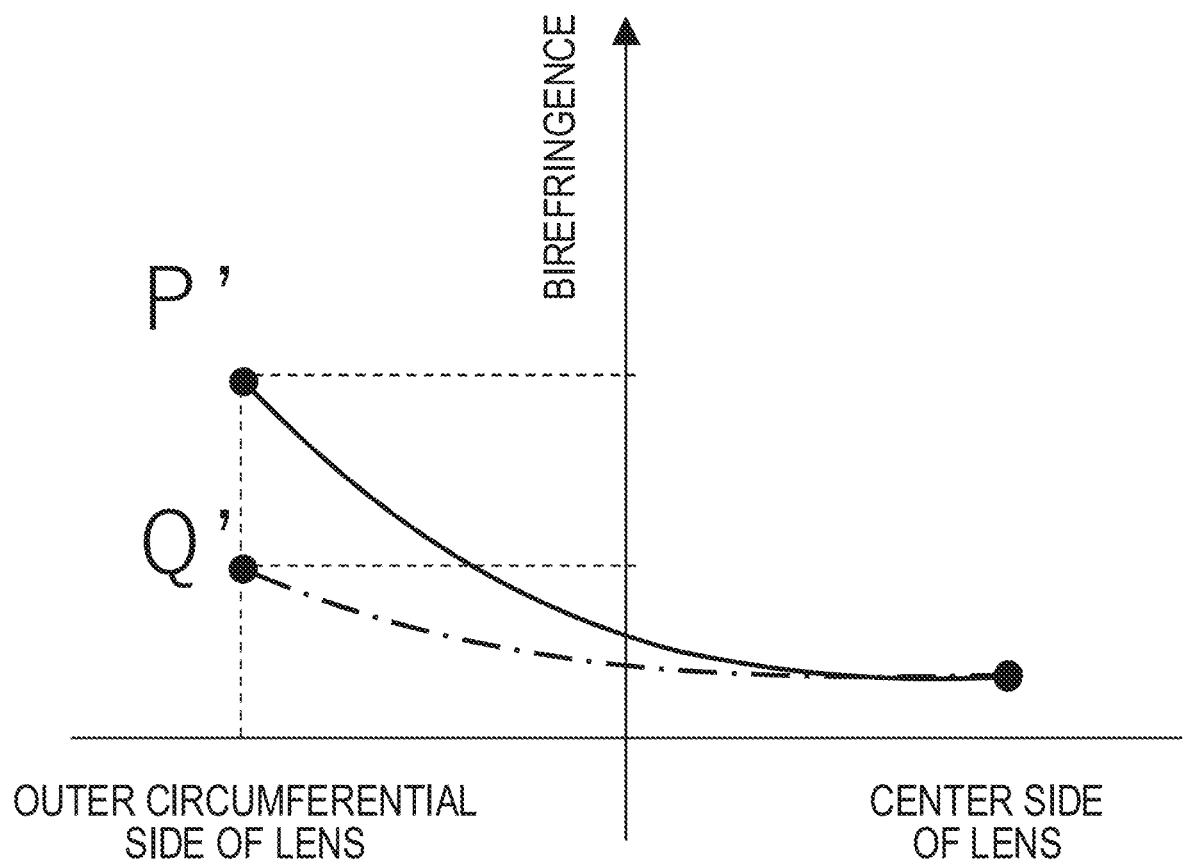
FIG. 4 is a graph for showing a difference of birefringence caused in laser beams in the first embodiment.

FIG. 4 is a schematic graph for showing, by means of curved lines P' and Q', the magnitude of the birefringence in the collimator lens 103 in a case in which the straight line connecting between the light emitting points L1o and L2o of the laser beams L1 and L2 is each of the straight line P illustrated in FIG. 3B and the straight line Q illustrated in FIG. 3C. In FIG. 4, the vertical axis represents the magnitude of the birefringence, and the horizontal axis represents the position of the collimator lens 103 through which the straight lines P and Q pass. In FIG. 4, the curved line P' is indicated by the solid line, and the curved line Q' is indicated by the dashed-dotted line. In FIG. 4, each of the curved lines P' and Q' has a small birefringence at a position close to the center side of the collimator lens 103. However, as moving toward the outer circumferential side of the collimator lens 103, the straight line P comes closer to the region having a large influence of the birefringence, and hence the birefringence of the straight line P indicated by the curved line P' is increased. Meanwhile, the straight line Q passes through a region outside of the region having a large influence of the birefringence, and hence the birefringence of the straight line Q indicated by the curved line Q' is smaller than that of the curved line P' indicating the straight line P.

In the first embodiment, the straight line Q connecting between the light emitting points L1o and L2o is a straight line in a direction orthogonal to the direction of the gate portion 201. For example, even when the straight line connecting between the light emitting points L1o and L2o is a straight line passing through the center of the collimator lens 103 and being parallel to the direction of the gate portion 201, similarly to the above-mentioned straight line Q, the laser beams L1 and L2 can be transmitted at positions having the smallest influence of the birefringence.

[Configuration of Laser Unit]

Figure 11A:
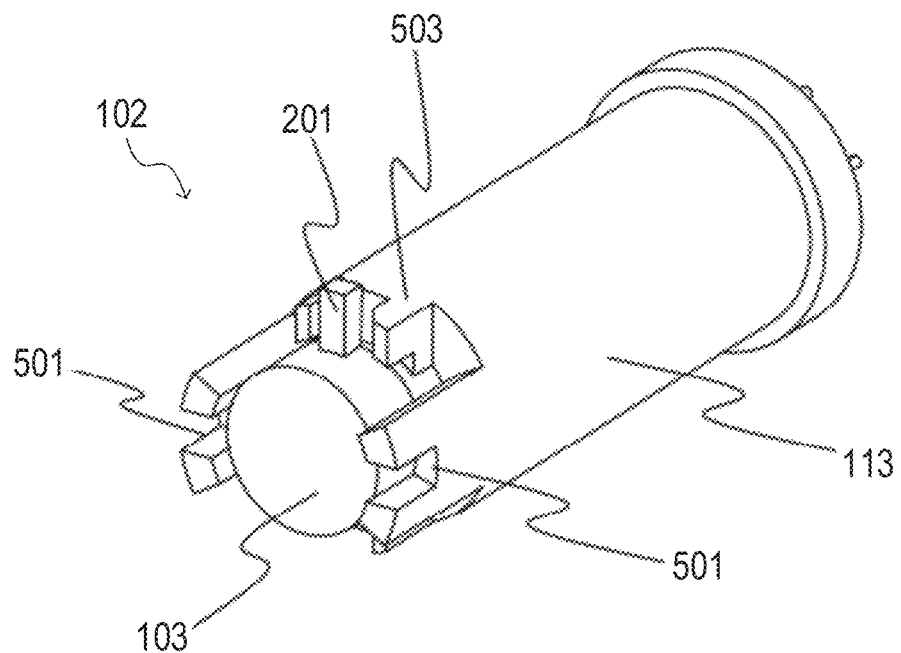
FIG. 11A and FIG. 11B are perspective views of the laser unit illustrated in FIG. 5B.
Figure 11B:
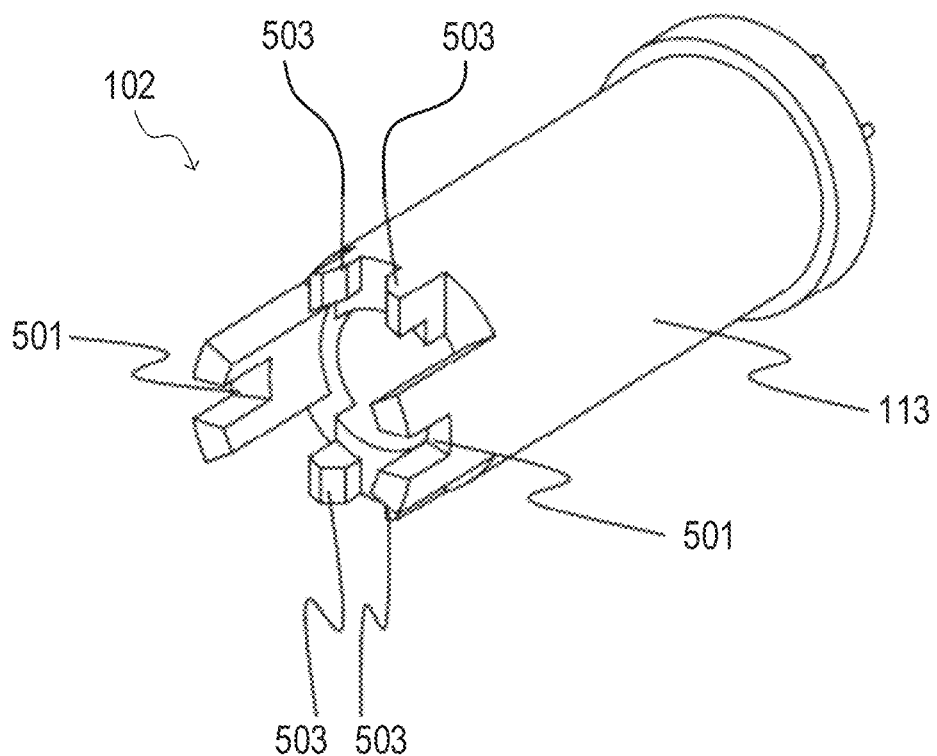

Next, the laser unit 102 in the first embodiment is described. FIG. 5A, FIG. 5B, and FIG. 5C are views for illustrating the outer shape of the laser unit 102. FIG. 5D is a sectional view for illustrating the configuration of the laser unit 102. FIG. 5B is a side view for illustrating the outer shape of the holder 113 when the laser unit 102 is viewed from a lateral side. FIG. 5A is a view when the laser unit 102 illustrated in FIG. 5B is viewed from the collimator lens 103 side on which the laser beams L1 and L2 emitted from the light source unit 114 exit. Further, FIG. 11A is a perspective view of the laser unit 102, and FIG. 11B is a perspective view when the collimator lens 103 is removed from FIG. 11A. The collimator lens 103 including the gate portion 201 is fixed with an adhesive to a lens fixing portion 501 of the holder 113. Meanwhile, FIG. 5C is a view at the time when the laser unit 102 illustrated in FIG. 5B is viewed from the light source unit 114 side, and four terminals of the multi-beam laser semiconductor of the light source unit 114 press-fitted and fixed to the laser unit 102 are protruding. FIG. 5D is a sectional view when the laser unit 102 illustrated in FIG. 5B is taken along a plane along the line VD-VD and the section plane is viewed from the lower side of FIG. 5B. As illustrated in FIG. 5D, the inside of the holder 113 is in a hollow state. The multi-beam laser semiconductor of the light source unit 114 described above is press-fitted and fixed to one end portion of the holder 113, and the collimator lens 103 is fixed to a lens temporary placement seating surface 502 at another end portion of the holder 113.

[Positioning of Gate Portion]

Figure 6:
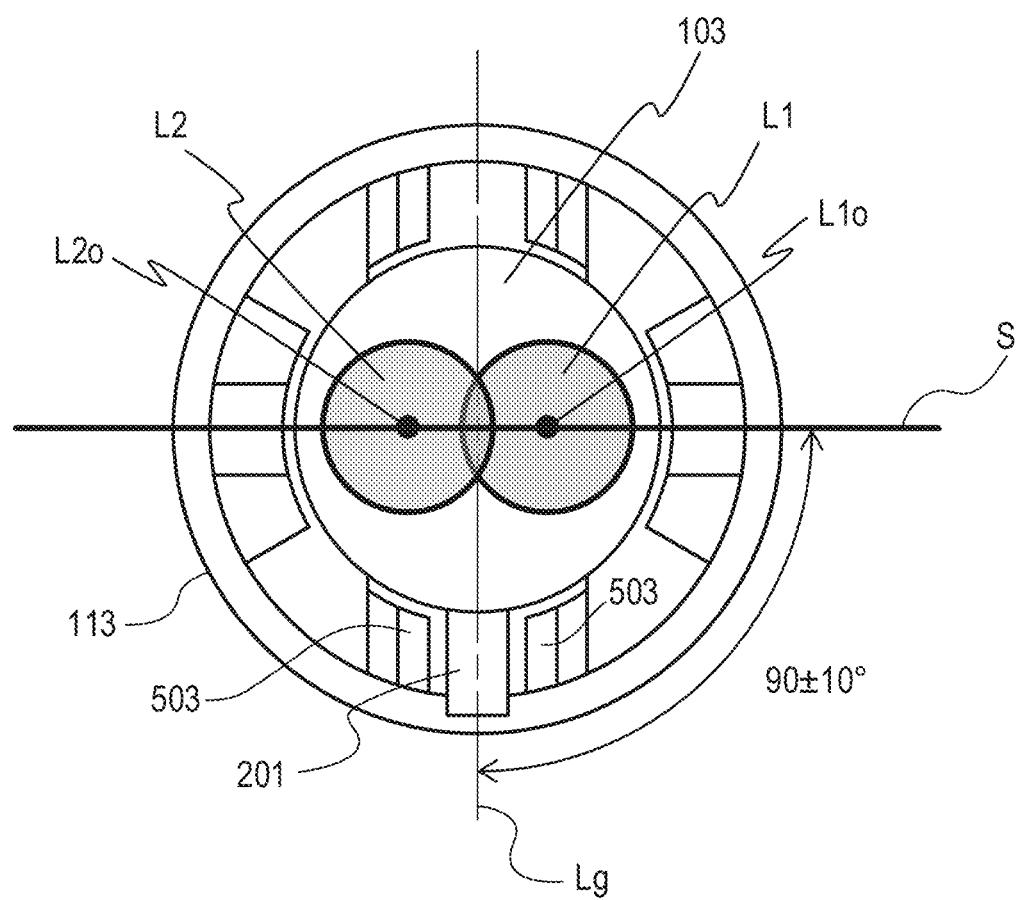
FIG. 6 is a view for illustrating a positional relationship between a gate portion of the collimator lens and a straight line connecting between light emitting points of laser beams in the first embodiment.

Next, the method of adjusting assembly of the collimator lens 103 to the holder 113 is described. First, the collimator lens 103 is temporarily placed on the lens temporary placement seating surface 502 (FIG. 5D) formed on the holder 113. FIG. 6 is a view for illustrating positions of the laser beams L1 and L2 transmitted through the collimator lens 103 and a positioning range of the gate portion 201 with respect to the holder 113 in the first embodiment. When the collimator lens 103 is temporarily placed on the lens temporary placement seating surface 502, the gate portion 201 of the collimator lens 103 is positioned as follows. That is, with position regulation ribs 503 (FIG. 5B) which are provided on the lens temporary placement seating surface 502 and have both functions of lens position regulation and gate position regulation, the direction of the gate portion 201 (straight line Lg connecting between the center of the collimator lens 103 and the gate portion 201) is positioned so as to be substantially orthogonal to a straight line S connecting between the light emitting points L1o and L2o of the laser beams L1 and L2. In this case, "substantially orthogonal" means that the direction falls within a range of about 90°±10°, including error factors of the position regulation ribs 503, the lens shape of the collimator lens 103, and the like. After the gate portion 201 is positioned with respect to the holder 113, positional adjustment in a three-dimensional direction is performed with respect to the light source unit 114, and the collimator lens 103 is fixed with an adhesive to the lens fixing portion 501 (FIG. 5A) of the holder 113.

Holding the collimator lens 103 and the light source unit 114 together in a fixed state by the holder 113 has the following advantage. That is, there is an advantage in that, even when the laser unit 102 is rotated about a cylinder axis of the holder 113 in order to adjust the scanning line interval on the photosensitive drum 112, a positioning phase of the collimator lens 103 and the straight line S connecting between the light emitting points L1o and L2o can be maintained.

[Effect Obtained by Positioning Gate Portion]

Next, an effect obtained by positioning the gate portion 201 is described. As described with reference to FIG. 3A, FIG. 3B, and FIG. 3C, the birefringence to be caused in the collimator lens 103 has a property of being distributed depending on the direction of the gate portion 201. When the direction of the straight line S connecting between the light emitting points L1o and L2o of the laser beams L1 and L2 is positioned in the direction orthogonal to the direction of the gate portion 201 (straight line Lg) as in the first embodiment, the following effect can be produced. That is, the laser beams L1 and L2 are transmitted through regions having a smaller influence of the birefringence in the collimator lens 103, thereby being capable of reducing an influence on an optical characteristic, such as an increase in spot diameter or reduction in light amount, to be exerted on the laser beams L1 and L2 due to the birefringence.

As described above, in the first embodiment, in the optical scanning apparatus 101 using the multi-beam laser semiconductor and the collimator lens made of a resin, the occurrence of image deterioration can be reduced, and a higher image quality can be achieved at low cost. In the first embodiment, the collimator lens 103 and the light source unit 114 are held by the holder 113 being the same holding member, but the present disclosure is not limited thereto. For example, the collimator lens 103 may be held by the optical box 111, and the light source unit 114 may be fixed to the holder 113. That is, the collimator lens 103 and the light source unit 114 may be held by different members. Further, in the first embodiment, the case in which the positioning direction of the gate portion 201 is the direction orthogonal to the straight line S connecting between the light emitting points L1o and L2o of the laser beams L1 and L2 has been described, but the present disclosure is not limited thereto. For example, the positioning direction of the gate portion 201 may be a direction parallel to the straight line S connecting between the light emitting points L1o and L2o of the laser beams L1 and L2.

As described above, according to the first embodiment, the increase in spot diameter of the laser beams L1 and L2 can be reduced at low cost through use of the collimator lens 103 made of a resin.

Second Embodiment

In the first embodiment, the embodiment in which, in the optical scanning apparatus including one light source unit, the influence exerted on the optical performance of the laser beam by the birefringence of the low-cost collimator lens made of a resin is reduced has been described. In a second embodiment, an embodiment in which, in an optical scanning apparatus including a plurality of light source units, the influence of the birefringence of the collimator lens is uniformly distributed so that the influence exerted on the optical performance of the laser beam is reduced is described. Members having the same configurations as those of the first embodiment are denoted by the same reference symbols for description, and description thereof is omitted here.

[Configuration of Optical Scanning Apparatus]

Figure 7:
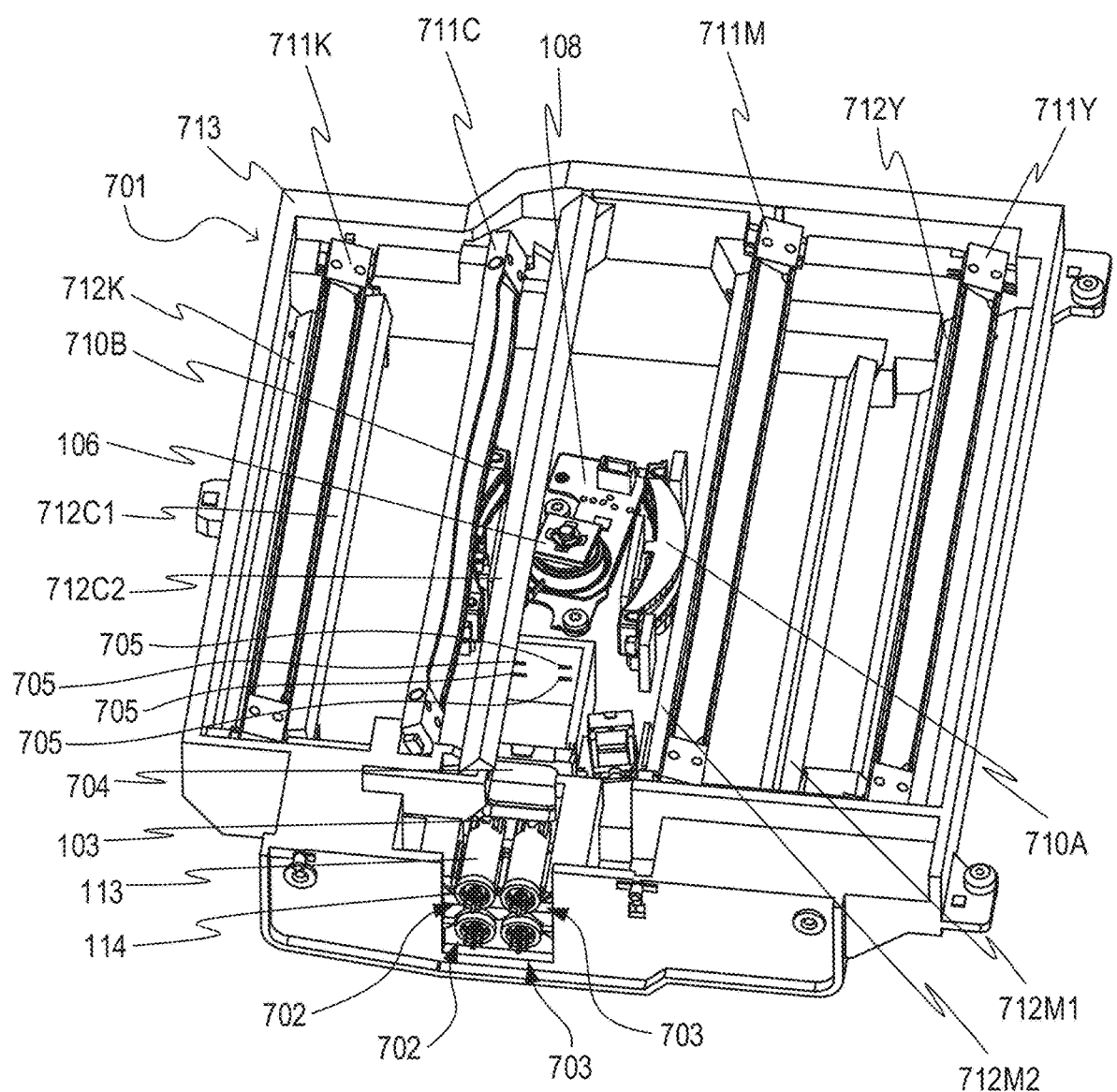
FIG. 7 is a schematic view for illustrating a configuration of an optical scanning apparatus of a second embodiment.

FIG. 7 is a schematic view for illustrating a configuration of an optical scanning apparatus 701 of the second embodiment. The optical scanning apparatus 101 of the first embodiment includes one light source unit, and radiates the laser beams to one photosensitive drum. Meanwhile, the optical scanning apparatus 701 of the second embodiment includes four light source units. An image forming apparatus to which the optical scanning apparatus 701 of the second embodiment is mounted includes four image forming portions configured to form toner images having toner colors of yellow (Y), magenta (M), cyan (C), and black (K). Further, each of the image forming portions forms a toner image by causing toner to adhere to an electrostatic latent image formed on a photosensitive drum through irradiation with the laser beam emitted from the optical scanning apparatus 701. The image forming apparatus performs image formation by transferring the toner images formed on the photosensitive drums of respective image forming portions onto a recording material serving as a recording medium.

As illustrated in FIG. 7, the optical scanning apparatus 701 includes four laser units, that is, two laser units 702 (upper and lower left side of FIG. 7) and two laser units 703 (upper and lower right side of FIG. 7). The two laser units 702 and the two laser units 703 are each arranged in the vertical direction (=rotation axial direction of the rotary polygon mirror 106). Further, the laser units 702 and 703 are arranged side by side in the horizontal direction (=direction orthogonal to the rotation axial direction of the rotary polygon mirror 106). Each of the laser units 702 and 703 includes the multi-beam laser light source unit 114 (hereinafter referred to as "light source unit 114"), the collimator lens 103, and the holder 113 configured to hold the light source unit 114 and the collimator lens 103. The two laser units 702 radiate laser beams to the photosensitive drums of the above-mentioned image forming portions configured to form the toner images of cyan (C) and black (K). Meanwhile, the two laser units 703 radiate laser beams to the photosensitive drums of the above-mentioned image forming portions configured to form the toner images of yellow (Y) and magenta (M).

Further, the optical scanning apparatus 701 includes a cylindrical lens 704, aperture diaphragms 705, and the rotary polygon mirror 106. Each of the aperture diaphragms 705 regulates a light beam emitted from the light source unit 114 and transmitted through the cylindrical lens 704. The light beam that has passed through the aperture diaphragm 705 enters the rotary polygon mirror 106. Further, the optical scanning apparatus 701 includes the scanner motor 108 and a circuit board (not shown). The scanner motor 108 drives the rotary polygon mirror 106 to rotate. The circuit board performs light emission control of the light source unit 114 held by the laser unit 102. The optical scanning apparatus 701 includes a first scanning lens 710A through which the laser beams emitted for the photosensitive drums of the image forming portions of yellow (Y) and magenta (M) are transmitted, and a first scanning lens 710B through which the laser beams emitted for the photosensitive drums of the image forming portions of cyan (C) and black (K) are transmitted. Further, the optical scanning apparatus 701 includes second scanning lenses 711Y, 711M, 711C, and 711K through which the laser beams for irradiating the photosensitive drums of the respective image forming portions are transmitted. Further, the optical scanning apparatus 701 includes reflection mirrors 712Y, 712M1, 712M2, 712C1, 712C2, and 712K for reflecting the laser beams for irradiating the photosensitive drums of the respective image forming portions. Symbols Y, M, C, and K added to the reference symbols of the second scanning lenses 711Y, 711M, 711C, and 711K and the reflection mirrors 712Y, 712M1, 712M2, 712C1, 712C2, and 712K represent that the members are optical members for allowing passage of laser beams to be radiated to the photosensitive drums of the respective toner colors of yellow, magenta, cyan, and black. In an optical box 713 serving as a casing of the optical scanning apparatus 701, the above-mentioned optical members are contained, and are fixed to the optical box 713 by press-fitting, bonding, screw fastening, or other methods. Each of the laser beams emitted from the laser units 702 and 703 passes through the collimator lens 103 made of a resin, the cylindrical lens 704, and the aperture diaphragm 705 to be deflected by the rotary polygon mirror 106. Each of the laser beams deflected by the rotary polygon mirror 106 is radiated to the photosensitive drum of the corresponding image forming portion via the corresponding first scanning lens 710, second scanning lens 711, and reflection mirror 712.

[Laser Unit]

FIG. 8A, FIG. 8B, and FIG. 8C are views for illustrating outer shapes of, among the four laser units illustrated in FIG. 7, a pair of laser units 702 and 703 adjacent to each other in the horizontal direction. FIG. 8B is a view for illustrating outer shapes of the holders 113 when the laser units 702 and 703 are viewed from the upper side of FIG. 7. FIG. 8A is a view when the laser units 702 and 703 illustrated in FIG. 8B are viewed from the collimator lens 103 side. The collimator lens 103 including the gate portion 201 is fixed with an adhesive to the lens fixing portion of the holder 113. Meanwhile, FIG. 8C is a view when the laser units 702 and 703 illustrated in FIG. 8B are viewed from the light source unit 114a or 114b side. As illustrated in FIG. 8C, four terminals protrude from each of the multi-beam laser semiconductors being the light source units 114a and 114b press-fitted and fixed to the holders 113. As illustrated in FIG. 8C, the laser units 702 and 703 hold the light source units 114a and 114b at one ends of the holders 113, respectively, at phases different from each other.

Figure 12:
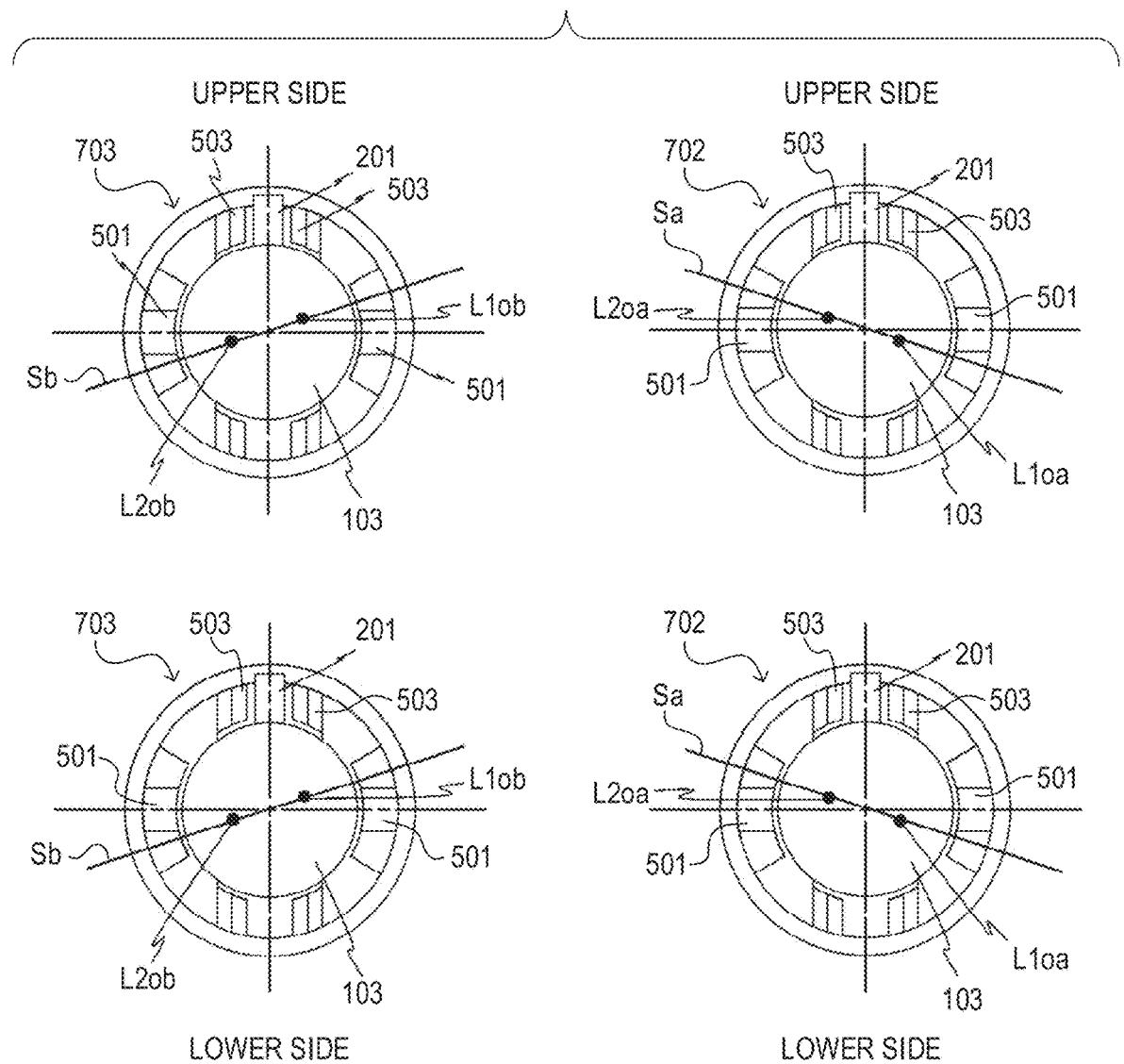
FIG. 12 is a view of a layout of four laser units in the second embodiment.

FIG. 12 is a view when the four laser units, that is, the upper laser unit 702, the lower laser unit 702, the upper laser unit 703, and the lower laser unit 703 are viewed from the collimator lens 103 side in the optical axis direction.

[Positioning of Gate Portion]

Figure 9:
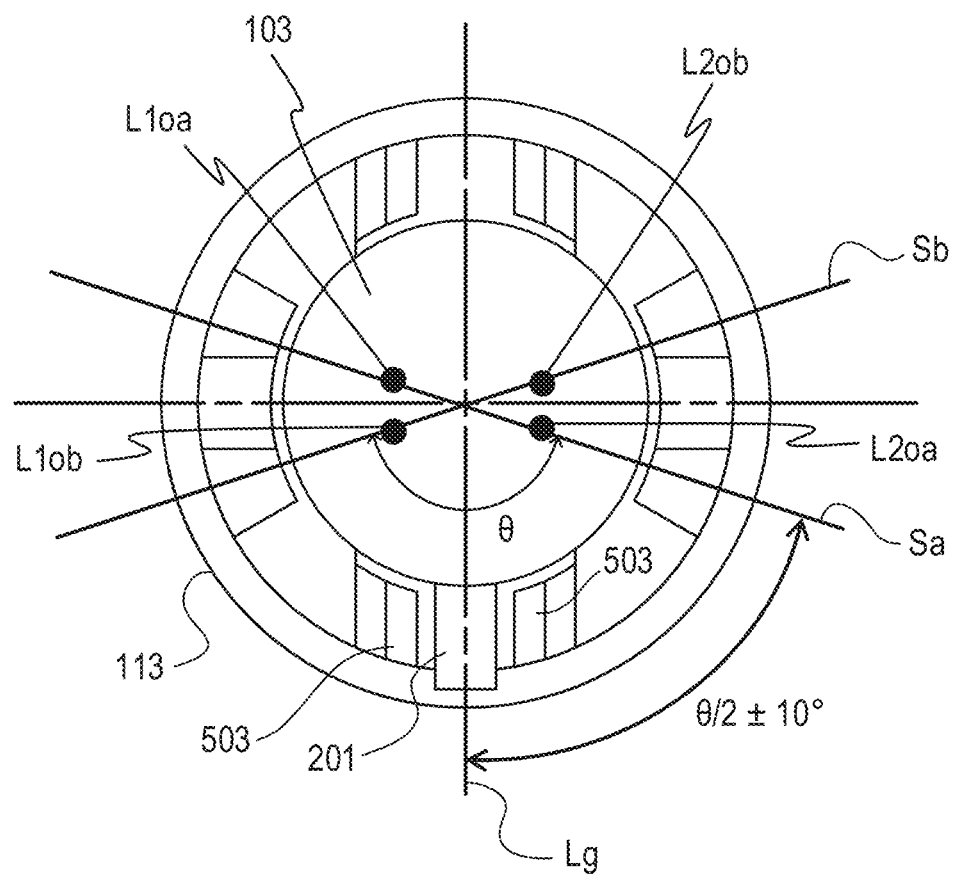
FIG. 9 is a view for illustrating a positional relationship between a gate portion of a collimator lens and each straight line connecting between light emitting points of laser beams in the second embodiment.

Next, a positioning range of the gate portion 201 of the collimator lens 103 made of a resin in the second embodiment is described. FIG. 9 is a view for illustrating positions of light emitting points L1oa and L2oa of the light source unit 114a and light emitting points L1ob and L2ob of the light source unit 114b, which are transmitted through the collimator lens 103 in the second embodiment, and a positioning range of the gate portion 201 with respect to the holder 113. In FIG. 9, there are illustrated a straight line Sa (first straight line) connecting between the light emitting points L1oa and L2oa of the light source unit 114a of the laser unit 702 illustrated in FIG. 8C, and a straight line Sb (second straight line) connecting between the light emitting points L1ob and L2ob of the light source unit 114b of the laser unit 703. Further, in FIG. 9, there are illustrated bisectors (indicated by the long dashed short dashed lines of FIG. 9) of angles (acute angle and obtuse angle) formed by the straight lines Sa and Sb intersecting with each other. The gate portion 201 of the collimator lens 103 is positioned in a direction substantially parallel to the bisector on the obtuse angle (angle θ) side among the angles formed by the straight lines Sa and Sb. In this case, "substantially parallel" means that the direction falls within a range of an angle of about θ/2±10°, including error factors of the position regulation ribs 503, the lens shape, and the like.

[Effect Obtained by Positioning Gate Portion]

Figure 10:
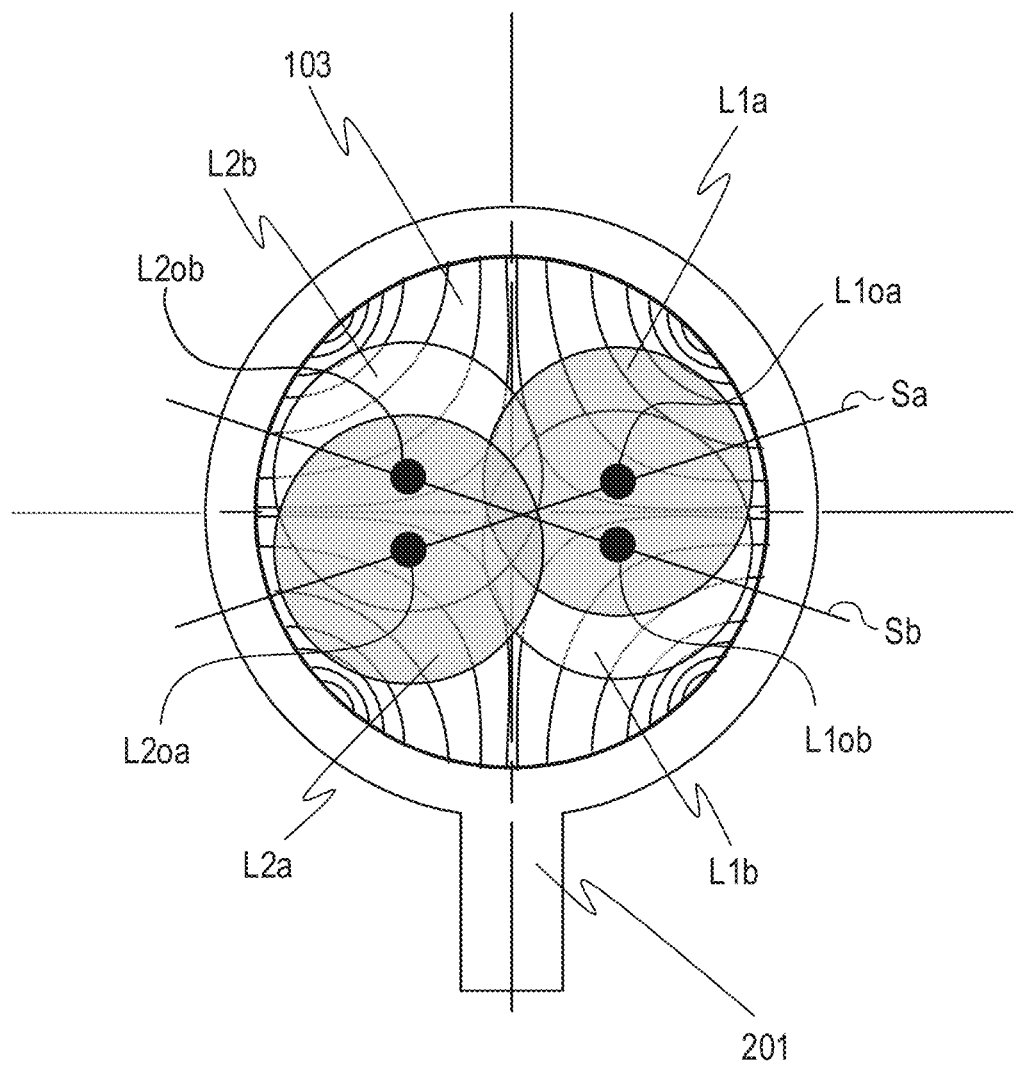
FIG. 10 is a view for illustrating a positional relationship between a birefringence distribution on the collimator lens and each straight line connecting between the light emitting points of the laser beams in the second embodiment.

Next, an effect obtained by positioning the gate portion 201 is described. FIG. 10 is a view for illustrating a positional relationship between the birefringence distribution on the collimator lens 103 and the laser beams L1 and L2 of the laser units 702 and 703. In FIG. 10, the straight line Sa is a straight line connecting between the light emitting points L1oa and L2oa of the light source unit 114a of the laser unit 702. Meanwhile, the straight line Sb is a straight line connecting between the light emitting points L1ob and L2ob of the light source unit 114b of the laser unit 703. Further, a range of a laser beam L1a emitted from the light emitting point L1oa of the light source unit 114a, a range of a laser beam L2a emitted from the light emitting point L2oa of the light source unit 114a, a range of a laser beam L1b emitted from the light emitting point L1ob of the light source unit 114b, and a range of a laser beam L2b emitted from the light emitting point L2ob of the light source unit 114b are each indicated by a circle. As in the second embodiment, when the gate portion 201 is positioned in a substantially parallel direction with respect to the bisector of the angle formed by intersecting the straight lines Sa and Sb each connecting between the light emitting points of the light source unit 114 of each of the laser units 702 and 703, the following effect can be produced. That is, the laser beams L1a and L2a emitted from the laser unit 702 and the laser beams L1b and L2b emitted from the laser unit 703 can be transmitted through regions having equal birefringence distributions on the collimator lens 103. In this manner, the influence of the birefringence to be caused between the laser unit 702 and the laser unit 703 which are different in position of the light source unit 114 can be uniformly distributed. As a result, the difference in optical characteristic of the laser beam between the photosensitive drums of different toner colors, which may be caused by the birefringence of the collimator lens 103, can be uniformly given and also reduced, and the occurrence of image deterioration can be reduced.

As illustrated in FIG. 12, in a case of an apparatus having a configuration in which the straight line Sa (first straight line) and the straight line Sb (second straight line) of two laser units (for example, upper laser unit 702 and upper laser unit 703) adjacent to each other in the direction orthogonal to the rotation axial direction of the rotary polygon mirror 106 intersect with each other, the straight line Sa (first straight line) and the straight line Sa (second straight line) of two laser units (for example, upper laser unit 702 and lower laser unit 702) adjacent to each other in the rotation axial direction are parallel to each other.

Further, although not shown, in a case of an apparatus having a configuration in which the straight line Sa (first straight line) and the straight line Sa (second straight line) of two laser units (for example, upper laser unit 702 and lower laser unit 702) adjacent to each other in the rotation axial direction intersect with each other, the straight line Sa (first straight line) and the straight line Sb (second straight line) of two laser units (for example, upper laser unit 702 and upper laser unit 703) adjacent to each other in the direction orthogonal to the rotation axial direction are parallel to each other.

As described above, in the optical scanning apparatus 701 including the plurality of laser units 702 and 703 each using the multi-beam laser semiconductor and the collimator lens 103 made of a resin, reduction in image equality can be suppressed, and a higher image quality can be achieved at low cost.

In the second embodiment, the collimator lens 103 and the light source unit 114 are held by the holder 113 being the same holding member, but the present disclosure is not limited thereto. For example, the collimator lens 103 may be held by the optical box 713, and the light source unit 114 may be fixed to the holder 113. That is, the collimator lens 103 and the light source unit 114 may be held by different members. Further, the positioning direction of the gate portion 201 is set to a direction substantially parallel to the bisector of the angle on the obtuse angle side among the angles formed by intersecting the straight lines Sa and Sb connecting between the light emitting points of the light source units 114a and 114b of the laser units 702 and 703, but the present disclosure is not limited thereto. For example, the positioning direction of the gate portion 201 may be a direction substantially parallel to a bisector of an angle on an acute angle side (which is also a direction substantially orthogonal to the bisector of the angle on the obtuse angle side) among the angles formed by the straight lines Sa and Sb intersecting with each other.

As described above, according to the second embodiment, the increase in spot diameter of the laser beams can be reduced at low cost through use of the collimator lens made of a resin.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-209701, filed Dec. 17, 2020, which is hereby incorporated by reference herein in its entirety.

What is claimed is:

1. An optical scanning apparatus, comprising:
   a laser unit including:
      a light source including a plurality of light emitting points configured to emit a plurality of beams;
      a collimator lens made of a resin, the collimator lens including a lens surface through which the plurality of beams emitted from the light source are transmitted and a gate portion provided at an outer circumferential portion of the lens surface; and
      a holder having a cylindrical shape and configured to hold the light source and the collimator lens; and
   a rotary polygon mirror configured to deflect the plurality of beams emitted from the laser unit,
   wherein the collimator lens is held by the holder so that, while viewing the collimator lens in an axial direction of the plurality of beams passing through the collimator lens, a straight line connecting between the gate portion and a center of the collimator lens is substantially parallel or substantially orthogonal to a straight line connecting between centers of the plurality of beams transmitting through the collimator lens.

2. The optical scanning apparatus according to claim 1, wherein the holder includes a rib configured to regulate a position of the gate portion to be held with respect to a circular direction of the cylindrical shape.

3. An optical scanning apparatus, comprising:
   four laser units each including:
      a light source including a plurality of light emitting points configured to emit a plurality of beams;
      a collimator lens made of a resin, the collimator lens including a lens surface through which the plurality of beams emitted from the light source are transmitted and a gate portion provided at an outer circumferential portion of the lens surface; and
a holder having a cylindrical shape and configured to hold the light source and the collimator lens; and
a rotary polygon mirror configured to deflect the plurality of beams emitted from each of the four laser units,
wherein the four laser units are so arranged to form two rows in each of a rotation axial direction of the rotary polygon mirror and a direction orthogonal to the rotation axial direction,
wherein, while viewing the collimator lens in an axial direction of the plurality of beams passing through the collimator lens, a first straight line connecting between centers of the plurality of beams transmitting through the collimator lens of one laser unit and a second straight line connecting between centers of the plurality of beams transmitting through the collimator lens of another laser unit adjacent to the one laser unit in the rotation axial direction or the direction orthogonal to the rotation axial direction intersect with each other to form an angle, and
wherein the collimator lens of the one laser unit is held by the holder of the one laser unit so that a straight line connecting between the gate portion and a center of the collimator lens of the one laser unit is substantially parallel or substantially orthogonal to a bisector of the angle formed by the first straight line and the second straight line intersecting with each other.

4. The optical scanning apparatus according to claim 3, wherein, in a case in which the first straight line and the second straight line of two laser units adjacent to each other in the rotation axial direction intersect with each other, the first straight line and the second straight line of two laser units adjacent to each other in the direction orthogonal to the rotation axial direction are parallel to each other, and
wherein, in a case in which the first straight line and the second straight line of the two laser units adjacent to each other in the direction orthogonal to the rotation axial direction intersect with each other, the first straight line and the second straight line of the two laser units adjacent to each other in the rotation axial direction are parallel to each other.

5. The optical scanning apparatus according to claim 3, wherein the holder includes a rib configured to regulate a position of the gate portion to be held with respect to a circular direction of the cylindrical shape.

6. An optical scanning apparatus, comprising:
a laser unit including:
a light source including a plurality of light emitting points configured to emit a plurality of beams; and
a holder having a cylindrical shape and configured to hold the light source;
a collimator lens made of a resin, the collimator lens including a lens surface through which the plurality of beams emitted from the light source are transmitted and a gate portion provided at an outer circumferential portion of the lens surface;
a rotary polygon mirror configured to deflect the plurality of beams emitted from the laser unit; and
an optical box configured to hold the laser unit, the collimator lens, and the rotary polygon mirror,
wherein the collimator lens is held by the optical box so that, while viewing the collimator lens in an axial direction of the plurality of beams passing through the collimator lens, a straight line connecting between the gate portion and a center of the collimator lens is substantially parallel or substantially orthogonal to a straight line connecting between centers of the plurality of beams transmitting through the collimator lens.

7. An optical scanning apparatus, comprising:
four laser units each including:
a light source including a plurality of light emitting points configured to emit a plurality of beams; and
a holder having a cylindrical shape and configured to hold the light source;
four collimator lenses each made of a resin, each of the collimator lenses including a lens surface through which the plurality of beams emitted from the light source are transmitted and a gate portion provided at an outer circumferential portion of the lens surface;
a rotary polygon mirror configured to deflect the plurality of beams emitted from each of the four laser units; and
an optical box configured to hold the four laser units, the four collimator lenses, and the rotary polygon mirror,
wherein the four laser units are so arranged to form two rows in each of a rotation axial direction of the rotary polygon mirror and a direction orthogonal to the rotation axial direction, and the four collimator lenses are arranged so as to form two rows in each of the rotation axial direction and the direction orthogonal to the rotation axial direction,
wherein, while viewing the four collimator lenses in an axial direction of the plurality of beams passing through the four collimator lenses, a first straight line connecting between centers of the plurality of beams transmitting through one collimator lens and a second straight line connecting between centers of the plurality of beams transmitting through another collimator lens adjacent to the one collimator lens in the rotation axial direction or the direction orthogonal to the rotation axial direction intersect with each other to form an angle, and
wherein the one collimator lens is held by the optical box so that a straight line connecting between the gate portion and a center of the one collimator lens is substantially parallel or substantially orthogonal to a bisector of the angle formed by the first straight line and the second straight line intersecting with each other.

8. An optical scanning apparatus, comprising:
four laser units including
a first laser unit including (A) a first light source including a plurality of light emitting points configured to emit a plurality of first beams, (B) a first collimator lens, made of a resin, including a lens surface through which the plurality of first beams emitted from the first light source is transmitted and a gate portion provided at an outer circumferential portion of the lens surface, and (C) a first holder having a cylindrical shape and configured to hold the first light source and the first collimator lens, and
a second laser unit including (A) a second light source including a plurality of light emitting points configured to emit a plurality of second beams, (B) a second collimator lens, made of a resin, including a lens surface through which the plurality of second beams emitted from the second light source is transmitted and a gate portion provided at an outer circumferential portion of the lens surface, and (C) a second holder having a cylindrical shape and configured to hold the second light source and the second collimator lens; and a rotary polygon mirror configured to deflect the plurality of first beams emitted from the first laser unit and the plurality of second beams emitted from the second laser unit, wherein, when viewing in an axial direction of the plurality of first beams passing through the first collimator lens, the four laser units are so arranged to form two rows in each of a rotation axial direction of the rotary polygon mirror and a direction perpendicular to the rotation axial direction, wherein, when viewing in the axial direction of the plurality of first beams passing through the first collimator lens, the second laser unit is arranged adjacent to the first laser unit in the rotation axial direction or the direction perpendicular to the rotation axial direction, wherein, when viewing in the axial direction of the plurality of first beams passing through the first collimator lens, a straight line connecting between centers of the plurality of first beams transmitting through the first collimator lens and a straight line connecting between the gate portion of the first collimator lens and a center of the first collimator lens intersect with each other to form a first angle and an angle (=180 degree—the first angle), wherein, when viewing in an axial direction of the plurality of second beams passing through the second collimator lens, a straight line connecting between centers of the plurality of second beams transmitting through the second collimator lens and a straight line connecting between the gate portion of the second collimator lens and a center of the second collimator lens intersect with each other to form a second angle and an angle (180 degree—the second angle), wherein the first angle is smaller than the angle (=180 degree—the first angle), and the second angle is smaller than the angle (=180 degree—the second angle), and wherein the first angle and the second angle are substantially the same.

9. The optical scanning apparatus according to claim 8, wherein the four laser units include
a third laser unit including (A) a third light source including a plurality of light emitting points configured to emit a plurality of third beams, (B) a third collimator lens, made of a resin, including a lens surface through which the plurality of third beams emitted from the third light source is transmitted and a gate portion provided at an outer circumferential portion of the lens surface, and (C) a third holder having a cylindrical shape and configured to hold the third light source and the third collimator lens, and
a fourth laser unit including (A) a fourth light source including a plurality of light emitting points configured to emit a plurality of fourth beams, (B) a fourth collimator lens, made of a resin, including a lens surface through which the plurality of fourth beams emitted from the fourth light source is transmitted and a gate portion provided at an outer circumferential portion of the lens surface, and (C) a fourth holder having a cylindrical shape and configured to hold the fourth light source and the fourth collimator lens, wherein, when viewing in an axial direction of the plurality of third beams passing through the third collimator lens, a straight line connecting between centers of the plurality of third beams transmitting through the third collimator lens and a straight line connecting between the gate portion of the third collimator lens and a center of the third collimator lens intersect with each other to form a third angle and an angle (=180 degree—the third angle), wherein, when viewing in an axial direction of the plurality of fourth beams passing through the fourth collimator lens, a straight line connecting between centers of the plurality of fourth beams transmitting through the fourth collimator lens and a straight line connecting between the gate portion of the fourth collimator lens and a center of the fourth collimator lens intersect with each other to form a fourth angle and an angle (180 degree—the fourth angle), wherein the third angle is smaller than the angle (=180 degree—the third angle), and the fourth angle is smaller than the angle (=180 degree—the fourth angle), and wherein the first to the fourth angles are substantially the same.

10. The optical scanning apparatus according to claim 9, wherein each of the first to fourth holders includes a rib configured to regulate a position of the gate portion to be held with respect to a circular direction of the cylindrical shape.

* * * * *